United States Patent Office 3,326,541
Patented June 20, 1967

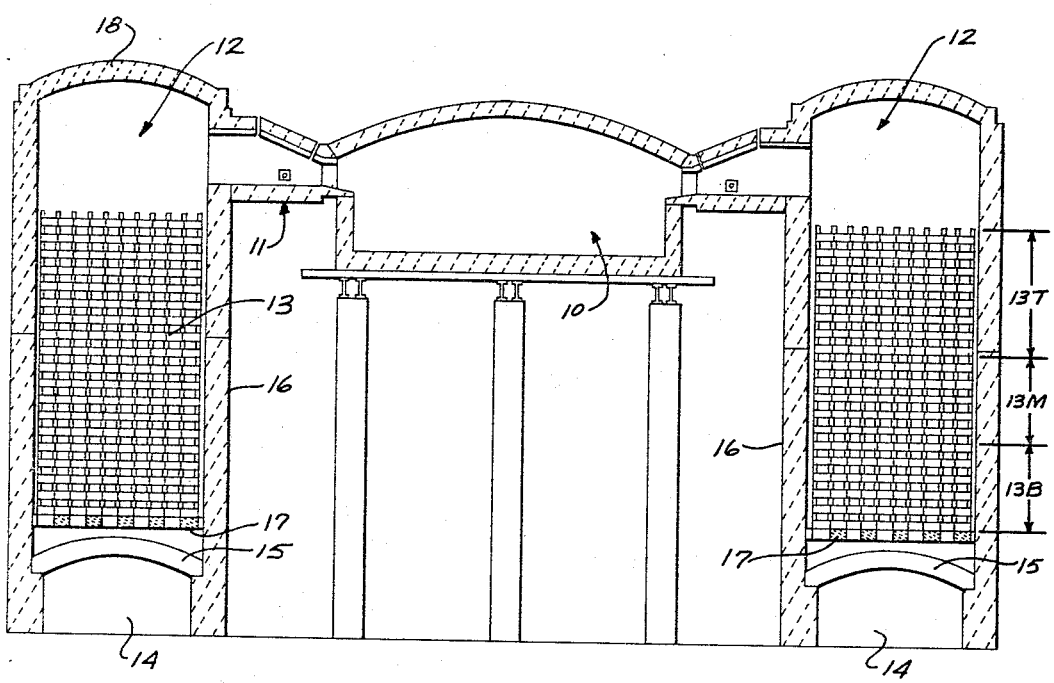

3,326,541
GLASS TANK STRUCTURE WITH A
REGENERATOR CHAMBER
Ben Davies and David C. Hanson, Pittsburgh, Pa., assignors to Harbison-Walker Refractories Company, Pittsburgh, Pa., a corporation of Pennsylvania
Filed Oct. 24, 1965, Ser. No. 504,764
4 Claims. (Cl. 263—15)

This invention relates to the structure of regenerative-type glass tanks. More particularly, this invention relates to the structure of glass tank regenerators with basic refractory checker settings.

The ever increasing progress in glassmaking practice has brought about greatly increased production of glass per square foot of melting area and per cubic foot of glass tank furnace volume. The severity of operating conditions which glass tank refractories are required to withstand continues to become greater as the push toward higher production continues. Much higher temperatures are employed, and the amount and corrosiveness of the batch carryover and volatile fluxes have increased.

The selection of optimal refractories for a glass tank would give the longest and most balanced life through all parts of the furnace. By balanced life, it is meant that all parts last about the same length of time. This requires special attention to the various positions where short service life might cause shutdown for repairs long before a complete rebuild of the glass tank is necessary.

For a long period of time the regenerators of glass tanks have been the limiting factor in glass tank service life. Within the regenerator, the topmost checkers have always received the most severe service. One move to improve the service life of glass tank regenerators has been to replace super duty fireclay checkers and high alumina checkers with basic brick checkers. Basic brick are those which are made from batches containing dead burned magnesite, chrome ore, olivine, etc. These have better chemical resistance to glass tank carryover. Transition to basic checker settings has not been altogether satisfactory, however, as the basic brick available have not had the necessary resistance to the combination of destructive effects present in checker settings, especially the upper settings.

With all basic checker settings, the total service life of the glass tank regenerator was extended, but uniform service life was difficult to obtain because the brick available did not offer a choice of brick properties sufficient to enable the tailoring of a uniformly resistant checker setting. That is, all zones had extended life, but the top checker settings did not last as long as the middle and lower checker settings.

It is therefore an object of this invention to provide a regenerative-type tank structure which will enjoy the longer service life available by using basic checker settings, but which will also have a more uniform service life.

It is another object of this invention to provide a glass tank regenerator structure comprising basic refractory brick which will have a longer and more uniform service life.

The objects and advantages of this invention are more easily understood by a reference to the drawing, the single figure of which is a schematic section view of a glass tank furnace. It should be pointed out that the drawing is only exemplary of the type of regenerator structure referred to in this specification and not intended to be limiting.

The raw materials of a glassmaking batch are melted in the tank 10 which is supplied with heat by the oxidation of fuel and preheated air. The fuel enters ports 11. To preheat the air, it is alternately drawn through the regenerators 12. The regenerators contain checker settings 13 which are a network of refractory brick. The checker settings are first heated by exhaust gas escaping through them. Thereafter, the checkers are cooled while transferring their heat to the combustion air being drawn through them. Air is supplied to the regenerators being cooled through canals 14. The opposite regenerator which is simultaneously being heated is exhausted through its corresponding canal 14. The checker settings are held above the canals by rider arches 15 which span the regenerator walls 15, and rider tile 17 which rest on the rider arches all of which rest on a floor. The regenerators are covered by a crown 18.

The checker settings are characterized by three wear zones; the top checkers 13T, the middle checkers 13M, and the bottom checkers 13B. The dominant service factors in the top checkers are different than the middle and lower zones. But, generally, the same factors are present to some degree in all zones, as will be understood from the following discussion.

Briefly, according to one aspect of this invention, a glass tank regenerator is provided which has an all-basic checker setting. The sidewalls, crown, and floor are fabricated from refractories selected from the group fireclay, high alumina, and silica brick. The rider arch is fabricated from super duty fireclay brick, as are the rider tile. The lower sections of the checker setting are comprised of chrome or chrome-magnesite brick. Middle settings are selected from stabilized forsterite, magnesite, or chrome-magnesite brick. The upper checker settings, which are the most critical, are comprised of burned or unburned high-purity magnesite brick, on an oxide basis, by weight, analyzing at least 90% MgO up to about 2% total $Al_2O_3$ plus $Fe_2O_3$ plus $Cr_2O_3$ there being lime and silica present, the lime/silica weight ratio being greater than 2:1. In a preferred embodiment the top checker settings are comprised of magnesite brick containing by weight on an oxide analysis at least 95%, of MgO up to about 1%, by weight total $Al_2O_3$ plus $Fe_2O_3$ plus $Cr_2O_3$, there being lime and silica present, the lime/silica weight ratio being about 2:1.

Four fundamental destructive effects have been recognized as having a direct bearing on checkerbrick life: (1) temperature cycling; (2) oxidation-reduction; (3) solid carryover; and (4) volatile carryover. In the top checker settings, high-temperature cycling is a serious factor, decreasing towards the middle where it overlaps with low-temperature cycling effects. The atmosphere in the top zone is laden with alkali vapors, although condensation is insignificant. Solid carryover is greatest. Oxidation-reduction conditions may vary from mild to severe.

In the middle zone, temperature fluctuations are relatively mild. Solid carryover is low and, because of lower temperatures, less reactive. The atmosphere is rich in alkali vapors, and some deposition of condensates occurs. Oxidation-reduction conditions may be present, but the effects are of less importance because of lower temperatures.

In the lower zone, temperatures are quite low, but the temperature cycles may be wide where cold incoming air enters the checker setting. The dominant characteristic of this zone is a large amount of condensing volatile constituents from the exhaust gases. Effects of oxidation-reduction and solid carryover on the refractories in this area are insignificant, although plugging may occur from the entrapment of solid dust fragments from higher up in the setting.

As pointed out before, in the past it was possible to select basic brick which could adequately cope with the combination of destructive mechanisms present in the middle and lower sections of the glass tank regenerator; however, an adequate basic refractory for the top checker settings which would give uniform service life to the entire checker setting was not available. These settings are characterized by severe high-temperature cycling.

Deterioration caused by temperature cycling may be characterized by expansion, accompanied by fine cracking, loss in strength, and eventual severe friability, or by cube cracking, depending upon brick composition and mineral placement. Basic brick with a dominant single phase such as magnesite typically cube or crack into small but solid fragments upon exposure to excessive temperature cycling. It has been thought that high-purity magnesite brick, containing less of auxiliary mineral phases, are the most resistant to cubing phenomenon. However, we have found that a controlled amount of auxiliary phases present in high-purity magnesite brick increases their resistance to high-temperature thermal cycling.

The following exemplary batches, shown in Table I, were prepared. They were tempered with lignin liquor and water in a Muller-type mixer, then pressed into brick at about 8000 p.s.i. They were dried in 250° F. for about five hours.

TABLE I

|  | A | B | C |
|---|---|---|---|
| Base Mix, 100 parts of grain with composition: | | | |
| Silica ($SiO_2$) | 1.5 | 0.8 | 0.7 |
| Alumina ($Al_2O_3$) | 0.4 | 0.3 | 0.3 |
| Iron Oxide ($Fe_2O_3$) | 1.0 | 0.3 | 0.3 |
| Lime (CaO) | 4.7 | 2.7 | 0.8 |
| Magnesite (MgO) | 92.0 | 93.9 | 98.0 |
| $CaO/SiO_2$ Ratio | 3.1/1 | 3.4/1 | 1.1/1 |
| Binders Added: | | | |
| Lignin Liquor, parts | 4 | 4 | 4 |
| Water, part | 1 | 1 | 1 |
| Sizing of Mixes: | | | |
| −4 +10 mesh | | 25–30% | |
| −10 +28 mesh | | 25–30% | |
| −28 +65 mesh | | 5–10% | |
| −65 mesh | | 35–45% | |

The unburned brick, A, B and C mixes, were submitted to three laboratory tests that predict the resistance of a brick to the destructive mechanisms present in checker settings, especially the top settings. The results of these tests are given in Table II.

TABLE II

|  | A | B | C |
|---|---|---|---|
| Cyclic Temperature Test, 500, 23 minute cycles, 2,280–2,700° F.: | | | |
| Volume Change, Percent | −3.6 | −2.7 | +0.1 |
| Linear Change | −0.6 | −0.7 | +0.4 |
| Cyclic Temperature-Slag Test, Sodium Sulfate, 300, 30 minute cycles, 1,500–1,800° F.: | | | |
| Specimens | | 6 x 1½ x 4¼ inch | |
| Slag Charge | | 160 grams of sodium sulfate pressed into 6 x 1 x 1 inch bar | |
| Linear Change, Percent | 0 | +0.3 | +1.5 |
| Appearance After Test | (1) | (1) | (2) |
| Cyclic Atmosphere Test, 800, 30 minute alternating oxidizing reducing cycles at 2,200° F.: | | | |
| Linear Change, Percent | +2.0 | +0.2 | −0.2 |

1 Unaffected.
2 Cracked and warped.

The brick of C mix are typical of those used in prior regenerator structures being built with basic brick. The brick of A and B mix are those used in the top zone of checker settings made according to this invention. Brick of A mix are exemplary of the brick used in the preferred structure of the invention.

The cyclic temperature test, results of which are given in Table II, is an accelerated test for ascertaining the resistance of brick to the destructive effects found in the upper portions of a checker setting. The results are given in percent volume change. A certain amount of shrinkage would be expected due to sintering and formation of a ceramic bond. Expansion is a manifestation of microcracking or crazing throughout the test specimens. Table II establishes that the brick used in the regenerator of this invention have increased resistance to cyclic temperatures over those of the prior art. Note that the brick of C mix has the linear expansion characteristic of microcracking and crazing, whereas brick of A and B mixes actually have a shrinkage.

Although sodium sulfate attack caused by condensation of gases is at a minimum in the upper checker settings, it is to some degree present. The cyclic temperature slag test results, which are also given in Table II, are an accelerated test for determining resistance of refractories to sodium sulfate attack. Note, brick of C mix, typical of the prior art, were cracked and badly warped as a result of attack by sodium sulfate, whereas brick of A and B mixes were unaffected.

The cyclic atmosphere tests, results of which are given in Table II, demonstrated that most all high-purity magnesite brick are resistant to alternating, oxidizing, and reducing atmospheres.

Table II establishes the superiority of high-purity magnesite brick containing a small amount of accessory oxides (which are carefully selected) to the destructive mechanisms present in the upper sections of glass tank checker settings.

Additional brick were made from A mix in Table I. However, these brick were burned at 2820° F. for 10 hours, after which they were subjected to the cyclic checker test. The brick had a volume change of −1.4% and a linear change of zero.

The shrinkage of A mix brick in Table I, which is indicative of sintering and absence of cracking, was reduced somewhat by firing prior to testing. This added volume stability is desirable.

Brick made from 80% of the grain used in A and B mixes and 20% of a grain having the chemical analysis: $SiO_2$—2.8%, $Al_2O_3$—0.3%, iron oxide—0.6%, CaO—1.8%, MgO—94.8%, could be used in the top checker settings of regenerators according to this invention. The lime-silica ratio would be reduced to about 2.3 to 1 which is acceptable.

The discovery of high purity magnesite with increased resistance to the thermal cycling enables the construction of a glass tank regenerator of basic brick which will have not only extended service life but more uniform service life.

Having thus described our invention with sufficient particularity to enable those skilled in the art to practice it, what is desired protected by Letters Patent is set out in the claims below:

We claim:
1. In a glass melting furnace, a regenerator chamber defined by an upper crown, a floor, and interconnecting sidewalls, said chamber containing a regenerator arch which spans opposing sidewalls and supports a plurality of rider tile, said rider tile supporting a checker setting disposed therabove, said checker setting being composed of an upper, middle, and lower zone, said sidewalls, crown, and floor being fabricated from refractories selected from the group consisting of fireclay, high alumina and silica brick, said rider arch and tile being fabricated from superduty fireclay brick, said lower zone of the checker setting being fabricated from refractories selected from the group consisting of chrome and chrome-magnesite brick said middle zone being fabricated from refractories selected from the group consisting of stabilized forsterite, magnesite and chrome-magnesite brick, and said upper zone being fabricated from magnesite brick containing by weight on an oxide analysis, at least 90% MgO, up to about 2% total $Al_2O_3$ plus $Fe_2O_3$ plus $Cr_2O_3$, there being CaO and $SiO_2$ present in a $CaO/SiO_2$ weight ratio greater than 2 to 1, whereby the glass furnace has a substantially uniform wear through said upper, lower, and middle checker settings zones.

2. A furnace according to claim 1 in which the upper checker setting zone is composed of magnesite brick analyzing, by weight on an oxide basis about 95% MgO, and up to about 1% total $AlO_3$ plus $Fe_2O_3$ plus $Cr_2O_3$, there being CaO and $SiO_2$ present, the $CaO/SiO_2$ weight ratio being about 2 to 1.

3. A furnace according to claim 1 in which the magnesite brick are burned.

4. In a glass melting furnace, a regenerator chamber containing a checker setting composed of an upper, middle and lower zone, said lower zone of the checker setting being fabricated from refractories selected from the group consisting of stabilized forsterite, magnesite and chrome-magnesite brick, and said upper zone being fabricated from magnesite brick analyzing by weight on an oxide basis at least 90% MgO, up to about 2% total $Al_2O_3$ plus $Fe_2O_3$ plus $Cr_2O_3$, there being CaO and $SiO_2$ present, the $CaO/SiO_2$ weight ratio being greater than 2 to 1, whereby the glass furnace has a substantially uniform wear through said upper, lower, and middle checker settings.

References Cited
UNITED STATES PATENTS

| | | | |
|---|---|---|---|
| 2,771,285 | 11/1956 | Heuer | 263—15 |
| 2,959,406 | 11/1960 | Heuer | 263—15 |

FREDERICK L. MATTESON, JR., *Primary Examiner.*

J. J. CAMBY, *Assistant Examiner.*